(12) United States Patent
Hendrie

(10) Patent No.: US 6,340,001 B1
(45) Date of Patent: Jan. 22, 2002

(54) CONVERTIBLE ANIMAL CONTROL LEASH

(76) Inventor: John V. Hendrie, 555N. Broad St. Apt. 810 A, Doylestown, PA (US) 18901

( * ) Notice: Subject to any disclaimer, the term of this patent is extended or adjusted under 35 U.S.C. 154(b) by 0 days.

(21) Appl. No.: 09/659,327

(22) Filed: Sep. 12, 2000

(51) Int. Cl.<sup>7</sup> ............................................... A01K 27/00
(52) U.S. Cl. ...................................................... 119/792
(58) Field of Search ................................. 119/792, 770, 119/769, 793, 795, 797, 798, 856, 863, 864

(56) References Cited

U.S. PATENT DOCUMENTS

| | | | | |
|---|---|---|---|---|
| 3,311,088 A | * | 3/1967 | Peterlin | |
| 5,335,627 A | * | 8/1994 | Bandimere | 119/856 |
| 5,511,515 A | * | 4/1996 | Brown et al. | 119/771 |
| 5,682,840 A | * | 11/1997 | McFarland | 119/856 |
| 5,791,295 A | * | 8/1998 | Schmid et al. | 119/793 |
| 5,893,339 A | * | 4/1999 | Liu | 119/792 |

* cited by examiner

*Primary Examiner*—Thomas Price
(74) *Attorney, Agent, or Firm*—Gregory J. Gore

(57) ABSTRACT

A single-strand leash has a large intermediate cinch-ring located a short distance along the leash from the point in which the leash fastens to the dog's collar. By encircling the dog's body and applying the well-known saddle-hitch-type knot to the free end length of the leash utilizing the cinch-ring, a harness-type control may be quickly and easily created. The knot may be tied while the collar and leash are on the dog so that a correctly-sized harness strap looped behind the dog's mid-section can be created. After tying off the body loop, the free end of the leash grasped by the handler simply trails from the end of the knot behind the cinch-ring.

6 Claims, 1 Drawing Sheet

CONVERTIBLE ANIMAL CONTROL LEASH

FIELD OF THE INVENTION

The present invention relates to small animal control devices, in particular a convertible leash for guard dogs.

BACKGROUND AND DESCRIPTION OF THE PRIOR ART

There have been various means to control small animals and pets by the use of a hand-held leash. Leashes have been devised in various configurations, either as a single strap attached to a collar around the animals neck or attached by a harness which encircles the animal's body to prevent escape and relieve the focus of control pressure from the animal's neck and to completely control the position of the animal's body and the forces applied to it. A halter-type control device is similar but has a cinch characteristic in which the greater the control pressure applied to the leash the greater the level of discomfort is inflicted to discourage the animal from pulling against the control.

Dogs trained for guard, security, riot or crowd control or search and rescue cannot have their temperament or concentration altered or aggressiveness limited by an leash or harness that would tend to restrict or retard their highly trained attitudes in stressful or tense situations. Narcotics search requires a team effort between dog and handler in all types of environments and the dog must be protected, yet a freedom of motion and agility must not be hindered in any manner. Dogs used for guard duty are selected from rather large animals that can be trained to work with the handler and take commands while possessing a demeanor to frighten and control a suspect. Security and crowd control dogs posses the ability to be threatening and move crowds of people as quickly as possible without injury to people or the animal. These dogs are trained to attack if necessary. The handlers leash or tether is the only attachment used to control the dog. Noise and confusion usually requires greater strength of the handler and the ruggedness and reliability of the leash. One handed control may be necessary. Search and rescue dogs must have the unhampered opportunity to concentrate and detect or smell very small quantity's of odor. Many of these situations can be in locations that are potentially dangerous to the dog, such as steep banks, pits, crevasses or the fast running water of streams and rivers. A dog can swim more efficiently if the front and rear legs are unhampered by a cumbersome harness. A loosely fitted body strap attached to the collar offers a safe and secure alternative to the harness while allowing complete swimming motion to the dog.

Thus, in the case of watch dogs, guard dogs and search dogs there is a specific need for a leash-type dog control in which the movement of the dog may be controlled without pain or discomfort applied to the body of the dog as the forward force increases, as in the case of a halter-type leash. Thus, a leash with a harness is preferred for police or military guard dogs, however, these can be bulky and difficult to apply as well as requiring different sizes to fit the size of the dog. If an attempt is made to simplify the harness by using a collar only, the collar may be slipped from the dog's head and control of the dog is lost. Furthermore, there are varying conditions where a harness may be desirable or a simple collar may be desired, however, no prior art device is known which is easily convertible between the two control configurations.

Adequate control of a dog is not only needed in cases of guard dogs or police dogs, but also high-spirited domestic pet dogs can become hyperactive and need more control than a standard collar can provide. Many dogs, in extremely tense situations have developed the ability to slip their collar, and once loose, can subject themselves to uncontrolled danger. The only method of controlling dogs of this type is a choke collar or a harness. The choker chain used by an inexperienced handler can cause injury to the dog. Dogs of very calm temperament can become extremely excited due to situations such as traffic, other dogs, a sudden loud noise, etc. with tragic results. Heretofore a tight-fitting collar has been the only solution, however, it is most uncomfortable for the dog and can cause injury during sudden bursts of abnormal behavior. On the other hand, a normally loose-fitting collar that provides comfort for the dog is an invitation for problems as in the tense situations described above. In these situations a harness is preferred.

The closest patent prior art of which the Applicant is aware is U.S. Pat. No. 5,682,840 issued to McFarland on Nov. 4, 1997. This reference discloses a halter-type harness with cinching loops that encircle each of the dog's front legs which apply discomfort to the dog the harder it pulls on the leash. The loops are formed by cords which pass through a slip ring which is tethered to the collar a short distance along the dog's back to a point between its shoulders. A second ring is located at the end of the cinch cords for attachment of a conventional single strand leash. The device shown in this reference is just another means for creating for a halter control which has the disadvantages mentioned above and cannot be used as a control leash.

There is therefore a need in the art for a convenient, effective and economical control leash for guard dogs and search dogs which provides the advantages of a harness-type control configuration without its complexity.

SUMMARY OF THE INVENTION

In order to solve the problems in the art described above, the present invention has been devised which is simple, economical and easily convertible between a simple collar control leash or a harness. The device is a single strand leash which has a large, intermediate cinch-ring located a short distance along the leash from the point at which the leash fastens to the dog's collar. As will be further described herein, by encircling the dog's body and applying the well-known saddle-hitch-type knot to the free end length of the leash utilizing the cinch-ring, a harness-type control may be quickly and easily created. Furthermore, the knot may be tied while the collar and leash are on the dog so that a correctly sized harness strap looped behind the dog's mid-section can be created. After tying-off the body loop, the free end of the leash grasped by the handler simply trails from the end of the knot behind the cinch-ring. Because the saddle-hitch-type knot is non-cinching, a harness rather than halter-top-type control is provided with the desirable characteristics as described above.

As an alternate embodiment of the present invention, an adjustable short strap with clip hooks at either end may be added as an optional way of forming the body-encircling loop. This additional length of strapping may also be clipped at both ends to a terminating loop at the end of the main leash to form a convenient loop handle when not employed as the body-encircling loop.

Therefore, the present invention has overcome the various problems of the prior art described above. It is thus the main object of the present invention to provide a harness and leash configurable from a simple, single strand element. It is further the object of the present invention to provide a leash which is convertible between a harness and simple collar configuration. An even further object of the present invention is to provide a simple, economical leash which is configurable into a harness-type control that may easily be adjusted to fit dogs of different size. These and other objects of the present invention will be apparent to those of skill in the art from the following description of the preferred embodiment.

DESCRIPTION OF THE PREFERRED EMBODIMENT

Figure 1:
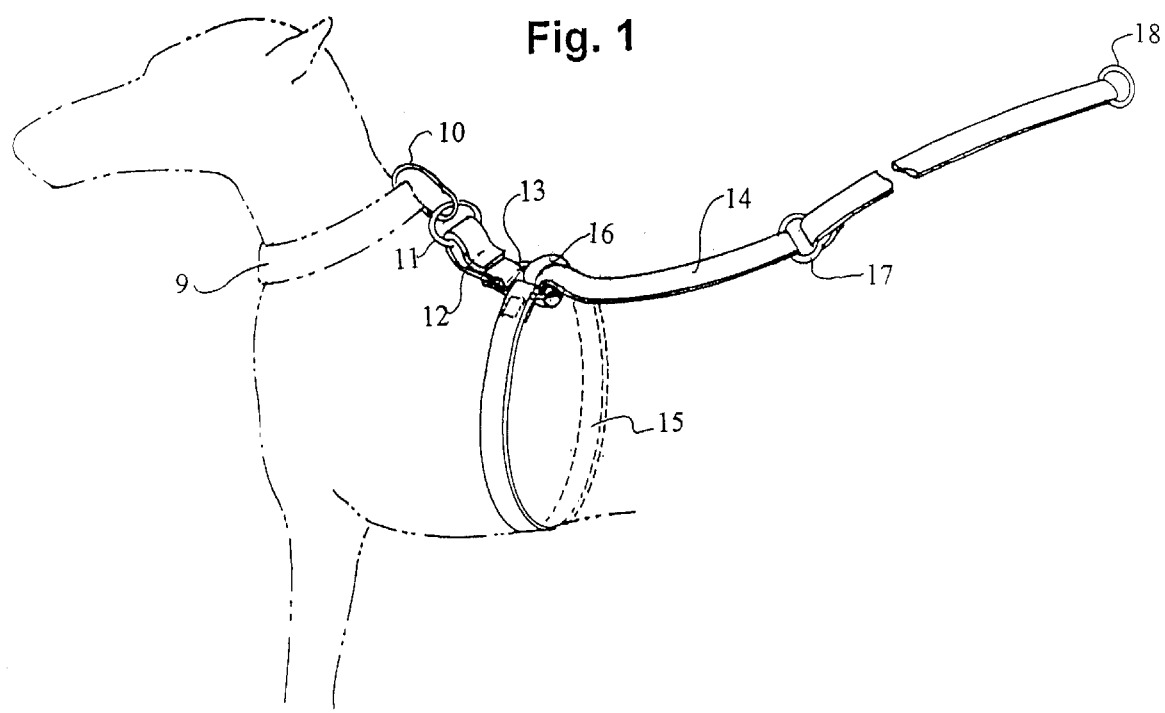
FIG. 1 is a top, right rearview of the present invention tied into a harness-type configuration around a dog shown in phantom.

Referring now to FIG. 1, the present invention is shown tied to a dog configured as a harness-type control. The one end of the leash is attached to the dog collar 9 by a simple clip hook 10 well known in the art. Following the clip hook is a ring 11 and a short strap section 12 which connects the hook to a large circular cinch-ring 13. The main portion 14 of the leash is then fitted around the body of the dog at mid-section and returned the ring to which it is tied off using a saddle-hitch knot 16 to form a restraining body loop 15. The remaining length of the leash, extending to its free end which may be terminated in any convenient way, for example a simple ring 18, establishes the distance from the harness tie point (i.e. the cinch-ring) to the dog's handler. The main portion of the leash may also include an additional intermediate ring 17 for tying-off the free end of the leash or as an attachment point for other control elements.

It will be well understood from this description that the tied harness configuration shown in FIG. 1 provides a control for the dog which is non-cinching and will not cause the dog discomfort. The loop 15 which encircles the body of the dog behind the front legs permits the handler control over the dog by providing a lifting force to the body of the dog. Also, greater retention of the dog collar is provided because it cannot be slipped over the dog's head to escape the control, being secured to the body encircling loop by attachment to the cinch-ring. The leash of the present invention may also be used in its untied condition as a straight, single-strand leash attached to the dog only by a detachable clip hook which is secured to the dog's collar. It's basic elements include a clip hook 10, ring 1, connecting strap 12, cinch-ring 13, and main leash strand 14.

Figure 2:
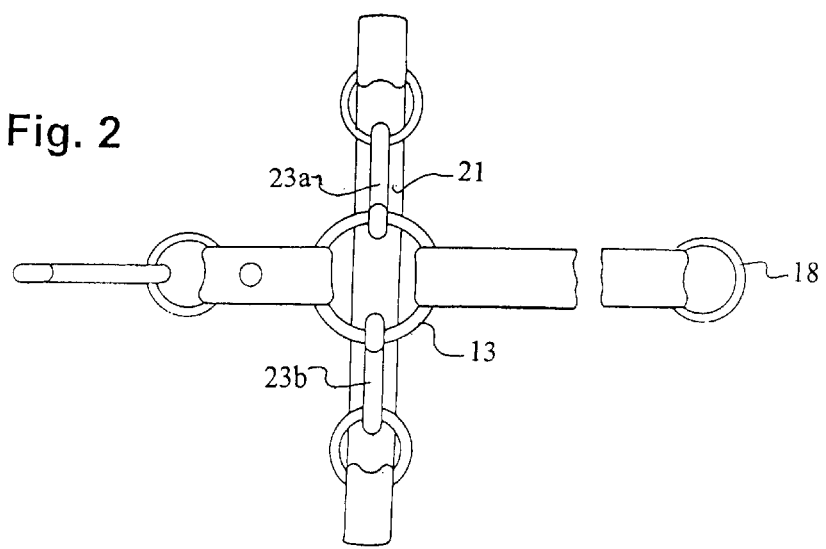
FIG. 2 is a top view of an alternate embodiment of the present invention.

Referring now to FIG. 2, an alternate embodiment of the present invention is shown which includes an adjustable additional length of strapping 21 which has rings and clip hooks 23a and 23b at opposite ends. As shown in this Figure, the body-encircling loop may alternately be formed by clipping the ends of the additional strapping 21 to opposite sides of the cinch-ring 13. This alternate embodiment provides a faster way of quickly forming the body-encircling loop without the need for hand-tying the knot shown in FIG. 1. This makes the conversion process to halter control much faster. When not used as the body-encircling loop, the additional length of strapping may be clipped at both ends to the terminating ring 18 at the end of the leash. In this position (not shown), the additional strapping forms a convenient loop-handle.

From the foregoing description it will be readily understood to those of skill in the art that objects of the present invention have been fulfilled. A simple and economical leash has been devised which may be used a single strand clip-on leash or as a harness-type control when tied around the body of the dog. The device is particularly useful for: home or travel, kennel or veterinarian, security dogs, police or military canine support department, search and rescue dogs, riot and crowd control, and narcotic educated search dogs. There may be also other obvious modifications and adaptations of the present invention using additional rings and clips or other methods of tying the leash which will provide yet greater possibilities for different uses of the invention without departing from its scope and spirit. It should be understood that the invention should only be limited in scope by the following claims and their legal equivalents.

What is claimed is:

1. A configurable dog leash, comprising:
   a leash having a clip hook and ring at a front end and a rear end;
   a short strap portion of said leash permanently attached to said clip hook at the front end;
   a cinch-ring attached to said short strap portion; and
   an elongate main portion of said leash permanently affixed to and extending rearward from said cinch-ring, further described in that a loop portion of said leash encircles the body of a dog and is affixed at a second point along its length to said cinch-ring by a knot located on the dog's back behind its shoulders.

2. The dog leash of claim 1, wherein said knot is a saddle-hitch.

3. A configurable dog leash comprising:
   a leash having terminal rings at the ends, a front ring and a rear ring;
   said front ring fitted with a first clip hook;
   a cinch-ring located along the length of said leash closer to said front ring than said rear ring, said cinch-ring being larger in diameter than said front or said rear ring;
   a separable body-encircling strand having rings and clip hooks at each end respectively, each of said clip hooks attached to opposite sides of said cinch-ring thereby forming a loop encircling the body of an animal when said first clip hook is attached to a collar around the neck of said animal.

4. The dog leash of claim 3 further described in that said separable body encircling strand is adjustable in its length.

5. A configurable dog leash comprising:
   a leash having terminal rings at the ends, a front ring and a rear ring;
   said front ring fitted with a first clip hook;
   a cinch-ring located along the length of said leash closer to said front ring than said rear ring, said cinch-ring being larger in diameter than said front or said rear ring;
   a separable body-encircling strand having a ring and a clip hook at one end, said body encircling strand attached to opposite sides of said cinch-ring and attached on one side by said clip hook thereby forming a loop encircling the body of an animal when said first clip hook is attached to a collar around the neck of said animal.

6. The dog leash of claim 5, further described in that said body encircling strand is adjustable in length.

* * * * *

UNITED STATES PATENT AND TRADEMARK OFFICE
CERTIFICATE OF CORRECTION

PATENT NO. : 6,340,001 B1
DATED : January 22, 2002
INVENTOR(S) : Hendrie

It is certified that error appears in the above-identified patent and that said Letters Patent is hereby corrected as shown below:

<u>Title page,</u>
Item [*] Notice, delete the phrase "by 0 days" and insert -- by 71 days --

Signed and Sealed this

Thirtieth Day of March, 2004

JON W. DUDAS
*Acting Director of the United States Patent and Trademark Office*